United States Patent
Stathis

(10) Patent No.: US 9,892,646 B2
(45) Date of Patent: Feb. 13, 2018

(54) CONTEXT-AWARE LANDING ZONE CLASSIFICATION

(71) Applicant: Sikorsky Aircraft Corporation, Stratford, CT (US)

(72) Inventor: Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/798,592

(22) Filed: Jul. 14, 2015

(65) Prior Publication Data

US 2016/0027314 A1      Jan. 28, 2016

Related U.S. Application Data

(60) Provisional application No. 62/027,318, filed on Jul. 22, 2014.

(51) Int. Cl.
| | | |
|---|---|---|
| *G08G 5/02* | (2006.01) | |
| *G08G 5/00* | (2006.01) | |
| *G01C 21/20* | (2006.01) | |

(52) U.S. Cl.
CPC .......... *G08G 5/0069* (2013.01); *G01C 21/20* (2013.01); *G08G 5/0021* (2013.01); *G08G 5/0086* (2013.01); *G08G 5/025* (2013.01); *B64C 2201/024* (2013.01); *B64C 2201/141* (2013.01)

(58) Field of Classification Search
CPC .... G01C 21/20; G08G 5/0021; G08G 5/0069; G08G 5/0086; G08G 5/025
USPC .................................................. 701/16, 461
See application file for complete search history.

(56) References Cited

U.S. PATENT DOCUMENTS

| | | |
|---|---|---|
| 7,492,965 B2 | 2/2009 | Blais |
| 7,747,364 B2 | 6/2010 | Roy et al. |
| 7,769,246 B2 | 8/2010 | Blais |
| 8,521,343 B2 | 8/2013 | Spinelli |

(Continued)

FOREIGN PATENT DOCUMENTS

WO         2013061066         5/2013

OTHER PUBLICATIONS

Wikipedia, Heuristic, Jun. 29, 2013, Wikipedia—The Free Encyclopedia.*

*Primary Examiner* — Mussa A Shaawat
*Assistant Examiner* — Nadeem Odeh
(74) *Attorney, Agent, or Firm* — Cantor Colburn LLP

(57) ABSTRACT

According to an aspect, a method of performing context-aware landing zone classification for an aircraft includes accessing a landing zone map, by a context-aware landing zone classification system of the aircraft, to identify potential landing zones. A database on the aircraft includes land cover map data and impervious surface map data. The database is queried to extract context data. The context data include land cover characteristics and impervious surface characteristics associated with locations corresponding to the landing zone map. The context-aware landing zone classification system of the aircraft evaluates the potential landing zones in view of the context data to adjust classifications of the potential landing zones and produce a context-aware landing zone classification of the potential landing zones. The context-aware landing zone classification of the potential landing zones is provided to landing zone selection logic of the aircraft to select a final landing zone.

13 Claims, 3 Drawing Sheets

(56) References Cited

U.S. PATENT DOCUMENTS

2010/0204919 A1    8/2010   Becker et al.
2011/0264312 A1   10/2011   Spinelli et al.
2012/0029869 A1    2/2012   Muensterer et al.
2013/0179011 A1    7/2013   Colby et al.

* cited by examiner

CONTEXT-AWARE LANDING ZONE CLASSIFICATION

CROSS-REFERENCE TO RELATED APPLICATIONS

This application claims the benefit of U.S. provisional patent application Ser. No. 62/027,318 filed Jul. 22, 2014, the entire contents of which are incorporated herein by reference.

BACKGROUND OF THE INVENTION

The subject matter disclosed herein generally relates to aircraft landing zone classification, and more particularly to context-aware landing zone classification for an aircraft.

Optionally-piloted vehicles (OPVs) and unmanned aerial vehicles (UAVs) can operate without a human pilot using autonomous controls. As OPVs and UAVs become more prevalent, they are being operated in less restricted and controlled areas. When OPVs and UAVs are operated autonomously in flight, they must identify a landing zone prior to landing. To account for unpredictable landing zone conditions, OPVs and UAVs typically use an image-based system to identify geometric factors that may impede a safe landing. Current art on autonomous landing zone detection has focused on three-dimensional (3D) terrain-based data acquisition modalities, such as LIght Detection and Ranging scanners (LIDAR), LAser Detection and Ranging scanners (LADAR), and RAdio Detection And Ranging (RADAR) for autonomous landing zone detection. While images can be valuable in identifying a safe landing zone, geometric factors may not provide enough information to determine whether a seemingly flat surface is a suitable landing site. For example, it may be difficult for image-based systems to discriminate between a dry field, a surface of a body of water, or a building top from only image information.

BRIEF DESCRIPTION OF THE INVENTION

According to an aspect of the invention, a method of performing context-aware landing zone classification for an aircraft includes accessing a landing zone map, by a context-aware landing zone classification system of the aircraft, to identify potential landing zones. A database on the aircraft includes land cover map data and impervious surface map data. The database is queried to extract context data. The context data include land cover characteristics and impervious surface characteristics associated with locations corresponding to the landing zone map. The context-aware landing zone classification system of the aircraft evaluates the potential landing zones in view of the context data to adjust classifications of the potential landing zones and produce a context-aware landing zone classification of the potential landing zones. The context-aware landing zone classification of the potential landing zones is provided to landing zone selection logic of the aircraft to select a final landing zone.

In addition to one or more of the features described above or below, or as an alternative, further embodiments could include receiving perception sensor data indicative of terrain representing the potential landing zones, and populating the landing zone map based on the perception sensor data.

In addition to one or more of the features described above or below, or as an alternative, further embodiments could include identifying features in the perception sensor data and establishing initial classifications of the potential landing zones based on the features identified.

In addition to one or more of the features described above or below, or as an alternative, further embodiments could include where the land cover map data include land topology characterizations defined over multiple geographic areas.

In addition to one or more of the features described above or below, or as an alternative, further embodiments could include where the impervious surface map data define locations of man-made surfaces over multiple geographic areas.

In addition to one or more of the features described above or below, or as an alternative, further embodiments could include where evaluating the potential landing zones further includes eliminating one or more of the potential landing zones from consideration based on the context data.

In addition to one or more of the features described above or below, or as an alternative, further embodiments could include where evaluating the potential landing zones further includes applying the context data as a mask onto the landing zone map and incorporating the mask into a heuristic calculation to determine classification confidence.

In addition to one or more of the features described above or below, or as an alternative, further embodiments could include receiving position data for the aircraft, determining geographic locations of the potential landing zones based on the position data, and querying the database to extract the context data based on the geographic locations of the potential landing zones.

In addition to one or more of the features described above or below, or as an alternative, further embodiments could include where the aircraft is autonomously controlled during landing based on the final landing zone selected by the landing zone selection logic in response to the context-aware landing zone classification.

According to further aspects of the invention, a system for context-aware landing zone classification for an aircraft is provided. The system includes a processor and memory having instructions stored thereon that, when executed by the processor, cause the system to access a landing zone map to identify potential landing zones and query a database on the aircraft that includes land cover map data and impervious surface map data to extract context data. The context data include land cover characteristics and impervious surface characteristics associated with locations corresponding to the landing zone map. The potential landing zones are evaluated in view of the context data to adjust classifications of the potential landing zones and produce a context-aware landing zone classification of the potential landing zones. The context-aware landing zone classification of the potential landing zones is provided to landing zone selection logic of the aircraft to select a final landing zone.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, context-aware landing zone classification is provided for an aircraft. The context-aware landing zone classification can operate in conjunction with other landing zone classification systems, such as sensor-based classification, to increase the probability of selecting a safe landing zone based on fusion of land cover map data and impervious surface map data to better determine potential landing zone context. Examples of contextual factors that can be determined from fused data sources include natural terrain quality such as water, forest, swamp, etc., as well as man-made impervious surfaces such as rooftops and other such factors that could impede a safe landing on what appears to be otherwise unobstructed terrain. Context-aware classification reduces the risk of potentially landing in a location that was determined suitable (i.e., substantially flat and smooth) based on observed features, but in reality would be a less desired and potentially unsafe landing surface. Embodiments do not rely upon context information from maps alone; rather, map-based context data are used to augment a landing zone map that may be based on geometric information captured from other sensors and/or databases, such as LIDAR, LADAR, RADAR, cameras, a priori digital terrain elevation data (DTED), and other such systems and data sources known in the art.

The inclusion of land cover map data and impervious surface map data in landing zone selection further assists in determining a landing zone where an aircraft can potentially land. Context-aware landing zone classification may be implemented in autonomous aircraft, such as optionally-piloted vehicles (OPVs) and unmanned aerial vehicles (UAVs and/or may be provided to assist in human-piloted aircraft landing zone selection.

Figure 1:
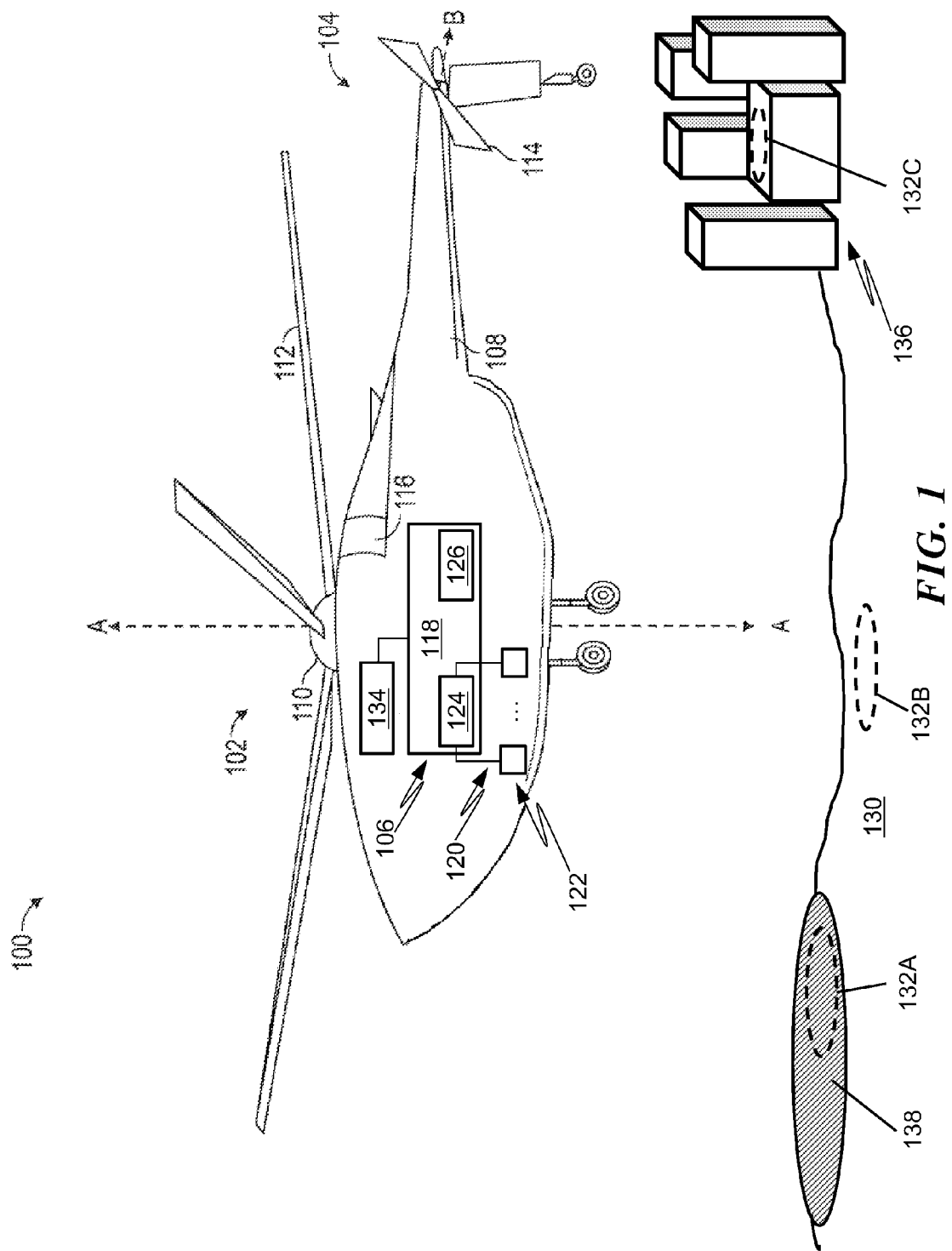
FIG. 1 is a perspective view of an exemplary rotary wing UAV aircraft according to an embodiment of the invention.

Referring now to the drawings, FIG. 1 illustrates a perspective view of an exemplary vehicle in the form of an autonomous rotary-wing unmanned aerial vehicle (UAV) 100 (also referred to as "autonomous UAV 100" or "aircraft 100") for implementing context-aware landing zone classification according to an embodiment of the invention. As illustrated, the autonomous UAV 100 is an aircraft that includes a main rotor system 102, an anti-torque system, for example, a tail rotor system 104, and a context-aware landing zone classification system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) may also benefit from embodiments disclosed.

The context-aware landing zone classification system 106 includes an aircraft computer system 118 having one or more processors and memory to process sensor data acquired from a sensing system 120. The sensing system 120 may be attached to or incorporated within the airframe 108. The sensing system 120 includes one or more perception sensors 122. The aircraft computer system 118 processes, in one non-limiting embodiment, raw data acquired through the sensing system 120 while the autonomous UAV 100 is airborne. A perception sensor processing system 124 interfaces with the perception sensors 122. The perception sensor processing system 124 may be incorporated within the aircraft computer system 118 or implemented as one or more separate processing systems that are in communication with the aircraft computer system 118 as part of the context-aware landing zone classification system 106. The aircraft computer system 118 also has a database 126 that stores context data, such as land cover map data and impervious surface map data.

The perception sensors 122 can capture perception sensor data of a terrain 130 for processing by the aircraft computer system 118 while the autonomous UAV 100 is airborne. In an embodiment, the perception sensors 122 may include one or more of: a downward-scanning LIDAR scanner, a video camera, a multi-spectral camera, a stereo camera system, a structure light-based 3D/depth sensor, a time-of-flight camera, a LADAR scanner, a RADAR scanner, or the like in order to capture perception sensor data indicative of the terrain 130 and determine geometric information and features of one or more potential landing zones 132A, 132B, and 132C for the autonomous UAV 100.

Additionally, the autonomous UAV 100 may include a navigation system 134, such as, for example, an inertial measurement unit (IMU) that may be used to acquire positional data related to a current rotation and acceleration of the autonomous UAV 100 in order to determine a geographic location of autonomous UAV 100, including a change in position of the autonomous UAV 100. The navigation system 134 can also or alternatively include a global positioning system (GPS) or the like to enhance positional awareness of the autonomous UAV 100.

In exemplary embodiments, the aircraft computer system 118 of the context-aware landing zone classification system 106 performs an analysis of one or more potential landing zones 132A, 132B, and 132C based on geometric features and further refines landing zone classification based on context data. For example, terrain 130 that is observed by the context-aware landing zone classification system 106 may include man-made surfaces 136 (e.g., building rooftops, roadways, bridges, etc.), such as those depicted near potential landing zone 132C that may rule out potential landing zone 132C as a final landing zone. While potential landing zones 132A and 132B may both appear to be substantially flat surfaces, geometric feature analysis alone may be unable to accurately discern that potential landing zone 132A is located upon a water body 138. Using context data extracted from the database 126, such as a land cover type of water for this location, potential landing zone 132A can be identified as water and therefore an unsuitable landing zone. Landing zone classification and identification can perform a number of comparisons to determine suitability of any number of potential landing zones as further described herein.

Figure 2:
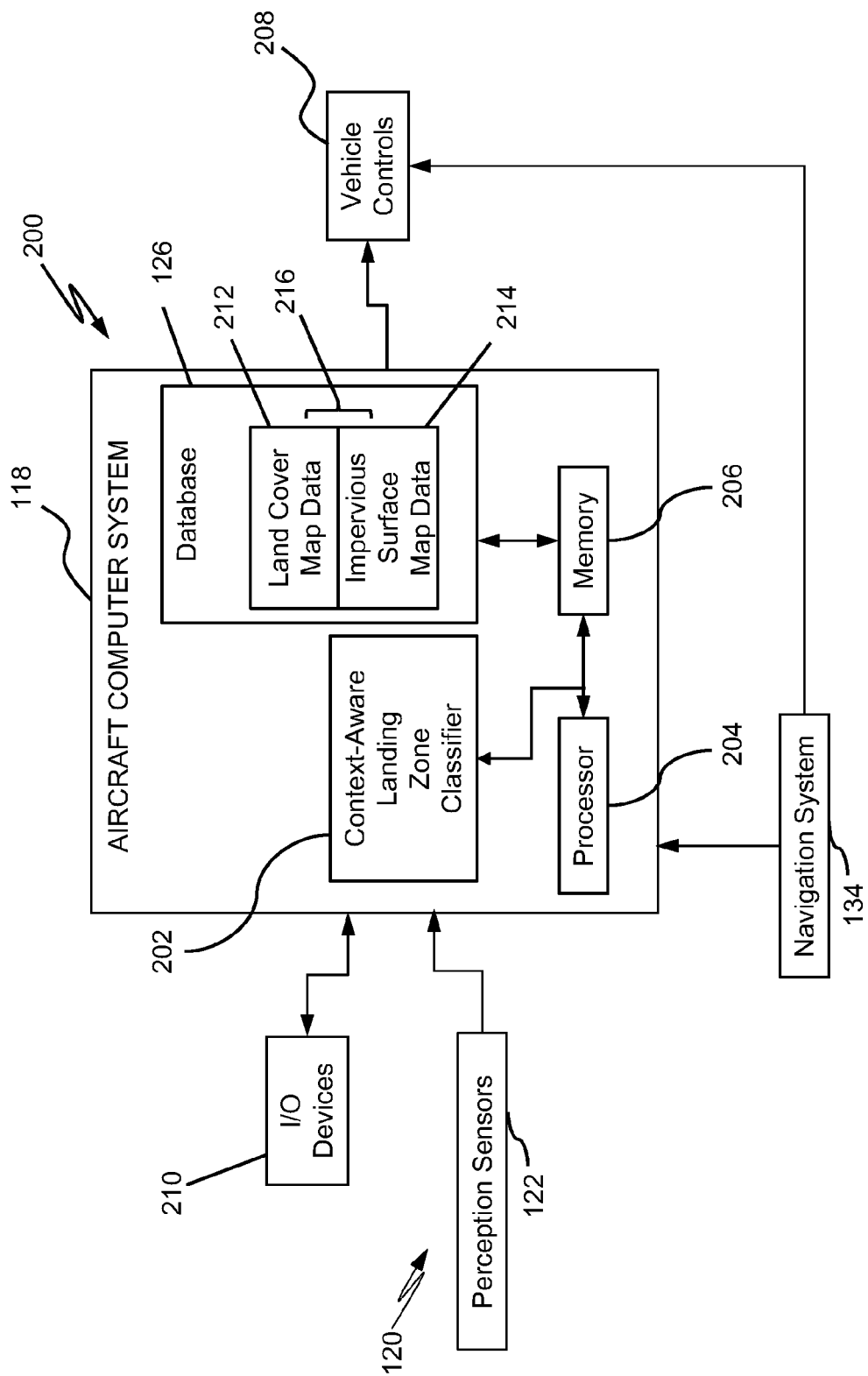
FIG. 2 is a schematic view of an exemplary computing system according to an embodiment of the invention.

FIG. 2 illustrates a schematic block diagram of a system 200 for context-aware landing zone classification onboard the autonomous UAV 100 of FIG. 1 according to an exemplary embodiment. The system 200 is an embodiment of the context-aware landing zone classification system 106 of FIG. 1. As illustrated, the system 200 includes the aircraft computer system 118 that executes instructions for implementing a context-aware landing zone classifier 202. The aircraft computer system 118 can receive raw sensor data on potential landing zones from one or more perception sensors 122. As depicted in FIG. 2, the aircraft computer system 118 includes a memory 206 that communicates with a processor 204. The memory 206 may store the context-aware landing zone classifier 202 as executable instructions that are executed by processor 204. The memory 206 is an example of a non-transitory computer readable storage medium tangibly embodied in the aircraft computer system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored. The processor 204 may be any type of processor, including a general purpose processor, a digital signal processor, a microcontroller, an application specific integrated circuit, a field programmable gate array, or the like. Although depicted as singular blocks, the processor 204 and memory 206 can be distributed between multiple processing circuits and memory subsystems. In an embodiment, the processor 204 performs functions of the perception sensor processing system 124 of FIG. 1.

The system 200 includes the database 126. The database 126 may be used to store land cover map data 212, impervious surface map data 214, and other data such as potential landing zone profiles, position data from navigation system 134, geometric profiles, and the like. Data in the database 126 can be periodically updated during on-ground maintenance or updated during flight, for instance, by wireless communication or otherwise acquired by the aircraft computer system 118. The land cover map data 212 and the impervious surface map data 214 can be uploaded from various sources, such as U.S. Geological Survey (USGS) data, self-collected data, or other third-party sources. The data stored in the database 126 can be formatted for implementing the context-aware landing zone classifier 202 and can include position reference information. For example, the land cover map data 212 and the impervious surface map data 214 can be formatted as two or more separate maps that are selectively fused on-demand as context data 216 based on one or more position references. Alternatively, the land cover map data 212 and the impervious surface map data 214 can be pre-fused into a two-dimensional grid of cells corresponding to locations, where each cell can include land cover characteristics and impervious surface characteristics as context data 216. The database 126 may be used to temporarily or permanently store data, to provide threshold and analysis criteria, to provide a record or log of the data stored therein, etc. In some embodiments, the database 126 may store relationships between data, such as one or more links between data or sets of data acquired through the modalities onboard the autonomous UAV 100 of FIG. 1 to support data fusion with the land cover map data 212 and impervious surface map data 214.

The system 200 may provide one or more controls, such as vehicle controls 208. The vehicle controls 208 may provide directives based on, e.g., data associated with the navigation system 134. Directives provided by the vehicle controls 208 may include navigating or repositioning the autonomous UAV 100 of FIG. 1 to an alternate landing zone for evaluation as a suitable landing zone. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust data and linking between data or sets of data. It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2. For example, in some embodiments the I/O device(s) 210 may be commanded by vehicle controls 208, as opposed to being commanded by the processor 204.

Figure 3:
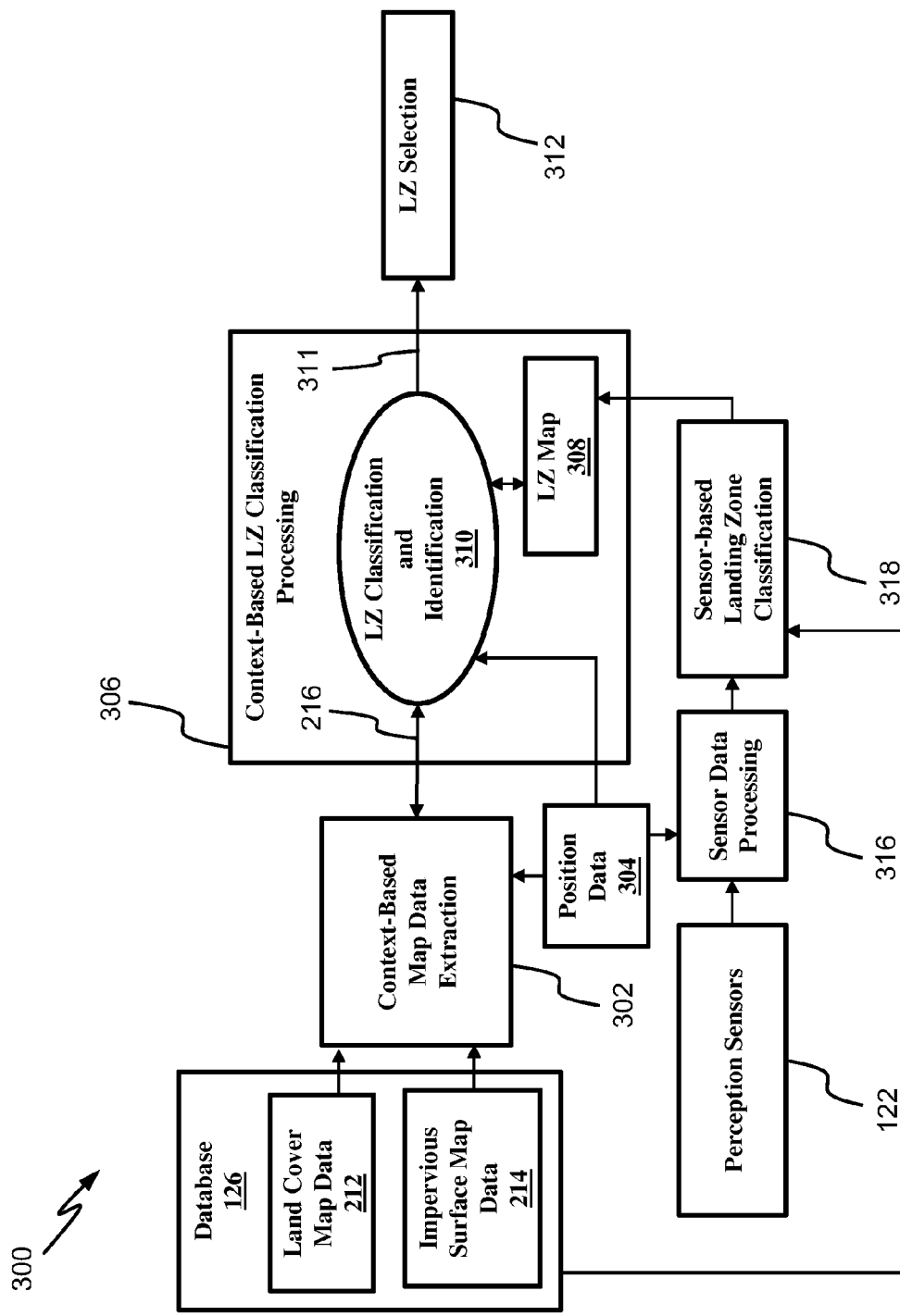
FIG. 3 illustrates a dataflow diagram of a context-aware landing zone classifier according to an embodiment of the invention.

FIG. 3 illustrates an exemplary data flow diagram 300 that is performed by the processor 204 of FIG. 2 for implementing the context-aware landing zone classifier 202 of FIG. 2 as part of the context-aware landing zone classification system 106 of FIG. 1 according to an embodiment. Context-based map data extraction 302 can access the land cover map data 212 and impervious surface map data 214 to extract context data 216. The land cover map data 212 and impervious surface map data 214 can reside in separate data structures or be stored in a single fused data structure. The context data 216 can include land cover characteristics and impervious surface characteristics associated with locations corresponding to a landing zone map 308. The land cover map data 212 may include land topology characterizations defined over multiple geographic areas, for instance, as a terrain type defined on a two-dimensional grid to distinguish open fields, wetlands, swamp, water bodies, sand, forest, and the like. The impervious surface map data 214 may define locations of man-made surfaces over multiple geographic areas, for example, as rooftops, concrete surfaces, asphalt surfaces, and the like. The impervious surface map data 214 may also be defined using a two-dimensional grid as a share grid with the land cover map data 212 or as one or more separate grids.

Context-based landing zone classification processing 306 can include landing zone classification and identification 310 that interfaces with the context-based map data extraction 302 and the landing zone map 308 to provide context-aware landing zone classification 311 of the potential landing zones 132A-132C (FIG. 1) to landing zone selection logic 312 to select a final landing zone. The landing zone classification and identification 310 can access the landing zone map 308 to identify the potential landing zones 132A-132C (FIG. 1).

Perception sensor data indicative of terrain 130 (FIG. 1) representing potential landing zones 132A-132C (FIG. 1) for the autonomous UAV 100 of FIG. 1 can be received at sensor data processing 316 from the perception sensors 122. The sensor data processing 316 may also receive position data 304, for example, from the navigation system 134 of FIGS. 1 and 2. Sensor-based landing zone classification 318 identifies features of the potential landing zones 132A-132C of FIG. 1 in the perception sensor data as sensor-based landing zone classification data. The sensor-based landing zone classification 318 is an example of processing performed by the perception sensor processing system 124 of FIG. 1. Reference images stored in database 126 (FIGS. 1 and 2) can be used to extract features using known image processing techniques, such as a scale-invariant feature transform. The landing zone map 308 can be populated based on the perception sensor data. The sensor-based landing zone classification 318 can establish initial classifications of the potential landing zones 132A-132C of FIG. 1 based on the features identified in the perception sensor data.

The landing zone classification and identification 310 can query the database 126 via the context-based map data extraction 302 to extract context data 216 associated with locations corresponding to the landing zone map 308. The landing zone classification and identification 310 can evaluate the potential landing zones 132A-132C (FIG. 1) in view of the context data 216 to adjust classifications of the potential landing zones 132A-132C (FIG. 1) and produce a context-aware landing zone classification 311 of the potential landing zones 132A-132C (FIG. 1). Evaluating the potential landing zones 132A-132C (FIG. 1) can further include eliminating one or more of the potential landing zones 132A-132C (FIG. 1) from consideration based on the context data 216 in a deterministic classification process. For example, flat and smooth surfaces of potential landing zones 132A and 132C of FIG. 1 can be eliminated from consideration upon determining that potential landing zone 132A is a water body and that potential landing zone 132C is a rooftop of a building.

Alternatively, evaluating the potential landing zones 132A-132C (FIG. 1) can include applying the context data 216 as a mask onto the landing zone map 308 and incorporating the mask into a heuristic calculation to determine classification confidence in a classification weighting process. Classification weighting can apply confidence values to classifications in the landing zone map 308 to indicate a likelihood of a suitable/unsuitable landing zone as well as a relative confidence in the determination. As more data values are analyzed, a greater degree of confidence can be assigned to each suitable/unsuitable assessment. For instance, a surface that is smooth, flat, dry, and not impervious to water would more likely have a higher suitability score than a surface that is smooth and flat but wet (e.g., water body, swamp, wetlands) or characterized as a rooftop. Depending upon the capabilities of the autonomous UAV 100 of FIG. 1 and known conditions of the local area where the autonomous UAV 100 of FIG. 1 is operating, various weightings and preferences can be defined in the database 126 to prefer certain landing zone attributes over others.

Position data 304 for the autonomous UAV 100 of FIG. 1 can be received at the landing zone classification and identification 310. Geographic locations of the potential landing zones 132A-132C (FIG. 1) can be determined based on the position data 304. Querying the database 126 to extract the context data 216 may also be based on the geographic locations of the potential landing zones 132A-132C (FIG. 1). The position data 304 can be used to match locations between the context data 216 and the landing zone map 308.

The landing zone classification and identification 310 provides the context-aware landing zone classification 311 to the landing zone selection logic 312 of the autonomous UAV 100 (FIG. 1). The landing zone selection logic 312 can create an ordered list of preferred landing zones and eliminate potential landing zones identified as unsuitable. The landing zone selection logic 312 may apply a number of factors when selecting a final landing zone, such as probability of sustaining damage associated with each type of landing zone, projected difficulty in reaching each potential landing zone, and other landing zone selection algorithms known in the art. The autonomous UAV 100 (FIG. 1) can be autonomously controlled during landing using the vehicle controls 208 of FIG. 2 based on the final landing zone selected by the landing zone selection logic 312 in response to the context-aware landing zone classification 311.

Technical effects include context-aware landing zone classification for an aircraft based on context data extracted from land cover map data and impervious surface map data to identify and adjust classifications of potential landing zones.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A method of performing context-aware landing zone classification for an aircraft, the method comprising:
   accessing a landing zone map, by a context-aware landing zone classification system of the aircraft, to identify potential landing zones;
   querying a database on the aircraft comprising land cover map data and fabricated surface map data associated with at least one fabricated surface to extract context data, wherein the context data comprise land cover characteristics and fabricated surface characteristics associated with the at least one fabricated surface, wherein the land cover characteristics and fabricated surface characteristics are associated with locations corresponding to the landing zone map, wherein the land cover map data and the fabricated surface map data are pre-fused into a two-dimensional grid of cells, wherein each cell corresponds to one of the plurality of locations and each cell comprises the land cover characteristics and the fabricated surface characteristics as the context data for the one of the plurality of locations corresponding to the cell;
   evaluating, by the context-aware landing zone classification system of the aircraft, the potential landing zones in view of the context data to adjust classifications of the potential landing zones and produce a context-aware landing zone classification of the potential landing zones, wherein evaluating the potential landing zones further comprises applying the context data as a mask onto the landing zone map and incorporating the mask into a heuristic calculation to determine classification confidence in a classification weighting, wherein the classification weighting applies a confidence value to the classifications of the potential landing zones in the landing zone map to indicate a likelihood of suitability and an associated confidence in the determination;
   providing the context-aware landing zone classification of the potential landing zones to landing zone selection logic of the aircraft to select a final landing zone; and
   autonomously controlling the aircraft during landing to land the aircraft using vehicle controls based on the final landing zone selection.

2. The method of claim 1, further comprising:
   receiving perception sensor data indicative of terrain representing the potential landing zones; and populating the landing zone map based on the perception sensor data.

3. The method of claim 2, further comprising:
identifying features in the perception sensor data; and
establishing initial classifications of the potential landing zones based on the features identified.

4. The method of claim 1, wherein the land cover map data comprise land topology characterizations defined over multiple geographic areas.

5. The method of claim 1, wherein the fabricated surface map data define locations of man-made surfaces over multiple geographic areas.

6. The method of claim 1, wherein evaluating the potential landing zones further comprises eliminating one or more of the potential landing zones from consideration based on the context data.

7. The method of claim 1, further comprising:
receiving position data for the aircraft;
determining geographic locations of the potential landing zones based on the position data; and
querying the database to extract the context data based on the geographic locations of the potential landing zones.

8. The method of claim 1, wherein the land cover map data are defined using a first two-dimensional grid, wherein the fabricated surface map data are defined using a second two-dimensional grid, and wherein pre-fusing the land cover map data and the fabricated surface map data comprises fusing the first two-dimensional grid and the second two-dimensional grid to generate the two-dimensional grid of cells.

9. A system for context-aware landing zone classification for an aircraft, the system comprising:
a processor; and
memory having instructions stored thereon that, when executed by the processor, cause the system to:
access a landing zone map to identify potential landing zones;
query a database on the aircraft comprising land cover map data and fabricated surface map data associated with at least one fabricated surface to extract context data, wherein the context data comprise land cover characteristics and fabricated surface characteristics associated with the at least one fabricated surface, wherein the land cover characteristics and the fabricated surface characteristics are associated with a plurality of locations corresponding to the landing zone map, wherein the land cover map data and the fabricated surface map data are pre-fused into a two-dimensional grid of cells, wherein each cell corresponds to one of the plurality of locations and each cell comprises the land cover characteristics and the fabricated surface characteristics as the context data for the one of the plurality of locations corresponding to the cell;
evaluate the potential landing zones in view of the context data to adjust classifications of the potential landing zones and produce a context-aware landing zone classification of the potential landing zones, wherein evaluating the potential landing zones further comprises applying the context data as a mask onto the landing zone map and incorporating the mask into a heuristic calculation to determine classification confidence in a classification weighting, wherein the classification weighting applies a confidence value to the classifications of the potential landing zones in the landing zone map to indicate a likelihood of suitability and an associated confidence in the determination;
provide the context-aware landing zone classification of the potential landing zones to landing zone selection logic of the aircraft to select a final landing zone; and
autonomously control the aircraft during landing to land the aircraft using vehicle controls based on the final landing zone selection.

10. The system of claim 9, wherein the landing zone map is populated based on perception sensor data that are received by the system and indicative of terrain representing the potential landing zones.

11. The system of claim 9, wherein the land cover map data comprise land topology characterizations defined over multiple geographic areas, and the fabricated surface map data define locations of man-made surfaces over multiple geographic areas.

12. The system of claim 9, wherein evaluation of the potential landing zones further comprises elimination of one or more of the potential landing zones from consideration based on the context data.

13. The system of claim 9, wherein geographic locations of the potential landing zones are determined based on position data received for the aircraft, and the database is queried to extract the context data based on the geographic locations of the potential landing zones.

* * * * *